United States Patent [19]
Rattunde et al.

[11] Patent Number: 4,618,338
[45] Date of Patent: Oct. 21, 1986

[54] LINK CHAIN FOR A VARIABLE RATIO CONE PULLEY TRANSMISSION

[75] Inventors: Manfred Rattunde; Herbert K. Steuer; Hans-Jürgen Wolf, all of Bad Homburg, Fed. Rep. of Germany

[73] Assignee: Reimers Getriebe AG, Zug, Switzerland

[21] Appl. No.: 710,141

[22] Filed: Mar. 11, 1985

[30] Foreign Application Priority Data

Apr. 10, 1984 [DE] Fed. Rep. of Germany ....... 3413384

[51] Int. Cl.$^4$ ............................................... F16G 1/21
[52] U.S. Cl. ..................................... 474/245; 474/242
[58] Field of Search ............... 474/245, 214, 201, 242, 474/244

[56] References Cited

U.S. PATENT DOCUMENTS 3,364,767  1/1968  Bredschneider et al. ........... 474/245
4,344,761  8/1982  Steuer ................................ 474/245

FOREIGN PATENT DOCUMENTS 459036  8/1913  Fed. Rep. of Germany ...... 474/245
3109265  3/1982  Fed. Rep. of Germany .

Primary Examiner—James A. Leppink
Assistant Examiner—Frank McKenzie
Attorney, Agent, or Firm—Frishauf, Holtz, Goodman & Woodward

[57] ABSTRACT

To reduce the noise level of chains connecting cone pulleys in variable ratio transmissions, in which chain links (1, 15, 43) are joined by rocker elements (3, 16, 44), frame bodies or frames elements (7, 8, 21, 22, 23, 30, 31, 32, 33, 46, 51, 64, 65) are positioned between adjacent hinge joints formed by the rocker elements, located transversely to the chain, the frame bodies having lateral engagement surfaces (11, 24, 25, 26, 55, 56, 57, 66, 67) located laterally adjacent to the sides of the outermost chain link elements for resilient frictional engagement with the facing surfaces of the cone pulleys (12, 40, 41) of the transmission, so that the transmission will be engaged by the engaging surfaces (45) of the rocker elements as well as the engagement surfaces of the frame bodies. The frame bodies are retained on the chain by force engagement with the chain link elements and/or the rocker elements.

16 Claims, 19 Drawing Figures

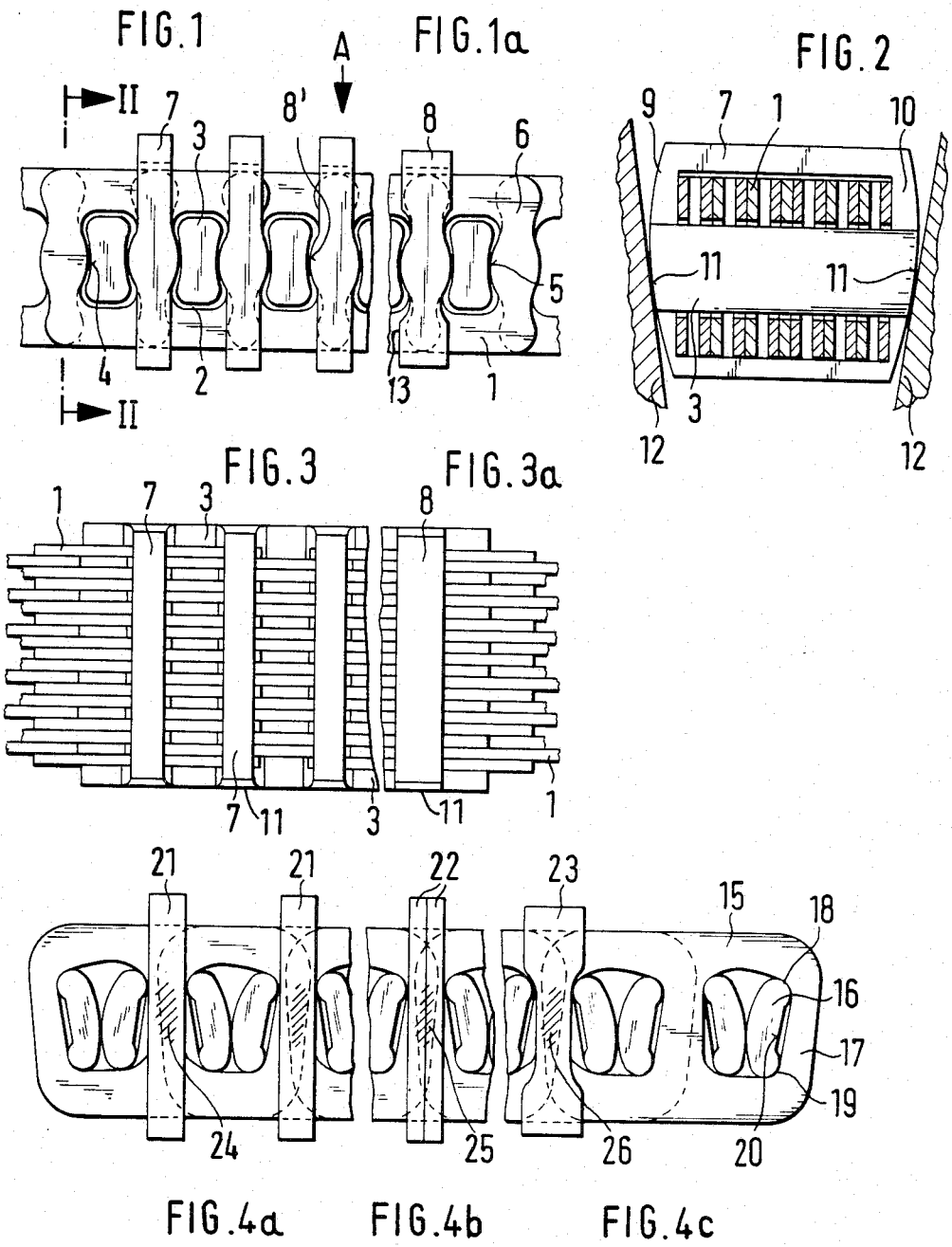

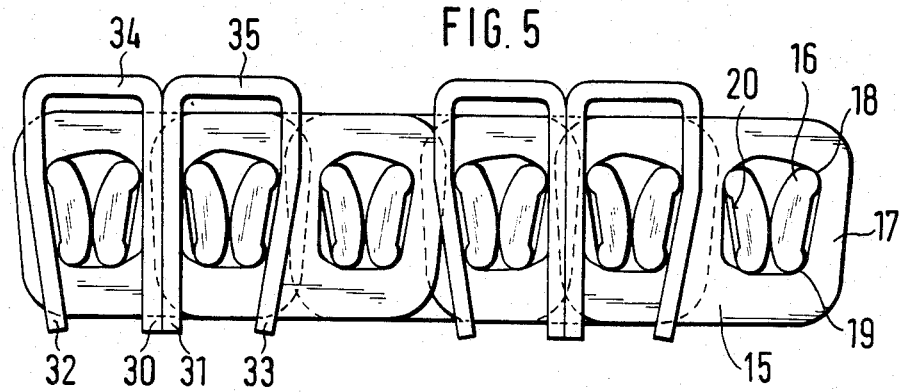
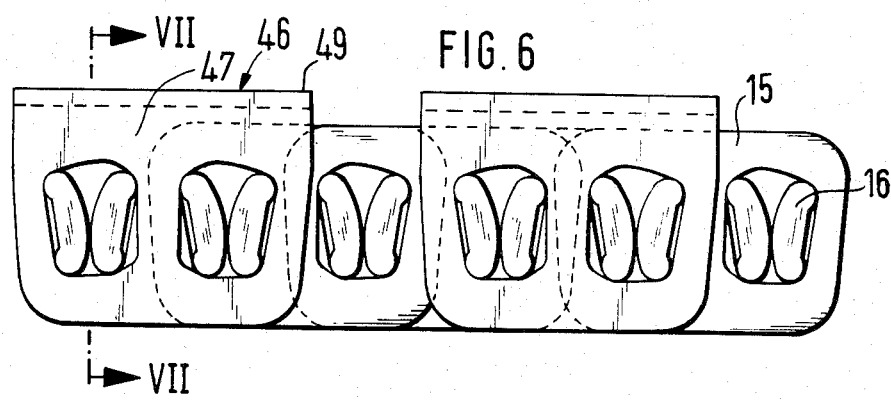
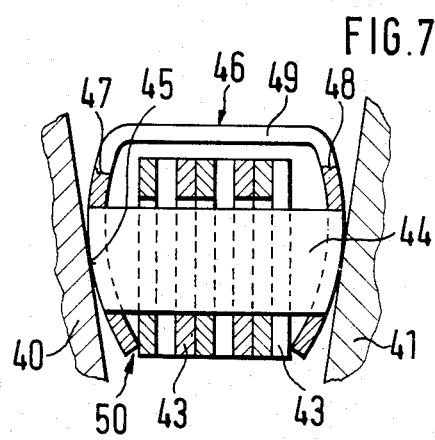
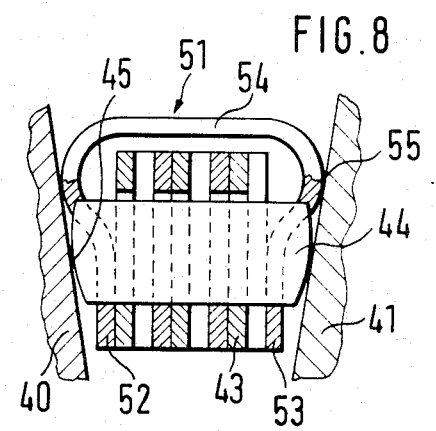

LINK CHAIN FOR A VARIABLE RATIO CONE PULLEY TRANSMISSION

Reference to related patents and applications, the disclosures of which are hereby incorporated by reference, assigned to the assignee of the present application:

U.S. Pat. No. 4,344,761, STEUER;
U.S. Ser. No. 285,869, filed July 21, 1981, RATTUNDE and SCHOPF;
U.S. Ser. No. 402,457, filed July 28, 1982, RATTUNDE.

Reference to related publication:
German Pat. No. 1,065,685; OS No. 21 09 265.

The present invention relates to a link chain, similar to a sprocket or roller chain, for an infinitely variable cone pulley transmission, in which side bars or chain links are connected by cross pins forming hinge elements, located in openings of the links, the link elements being so arranged that end surfaces thereof engage the cone surfaces of the cone pulleys for frictional engagement therewith, to thereby transmit rotary power.

BACKGROUND

Infinitely variable transmission ratio drives, formed by cone pulleys which can be spread apart, more or less, to vary the radial position of a chain engaging between facing cone pulleys are noisy. Much work has been done to reduce operating noise, and to reduce oscillations which occur upon engagement of the chain links and/or the connecting elements with the cones of the cone pulley. Such oscillations arise, for example, upon impingement of a chain element with the cone pulleys. These impingement forces cause shocks which not only result in noise of operation but, also, reduce the lifetime of the transmission.

It has been proposed to replace hinge pins connecting links of a link chain, such as a plate link chain similar to a sprocket chain by rocker elements, the rocker elements forming the hinge joints to permit the hinges of the chain to flex with respect to each other, and thus wrap between the cone pulleys. Reference is made to German Pat. No. 1,065,685, and specifically to U.S. Pat. No. 4,344,761, STEUER, and the referenced applications U.S. Ser. No. 285,869, filed July 21, 1981, RATTUNDE and SCHOPF, and application U.S. Ser. No. 402,457, filed July 28, 1982, RATTUNDE, the inventor hereof, the disclosures of the U.S. patent applications being hereby incorporated by reference. For example, it has been proposed to change the division or pitch ratio of the links so as to be non-uniform by providing for different distances between link elements; it has also been proposed to reduce the distances between joints, that is, to increase the pitch of the chain by suitable formation of the links and the rocker elements which engage therewith. All these efforts have resulted in substantial reduction of oscillation and, hence, noise level occurring in operation.

It has previously been proposed—see German Patent Disclosure Document DE-OS No. 31 09 265—to include loading blocks between joint connections, which are used to transmit frictional forces. The placement of these loading blocks, and their pitch, with respect to the chain, depends on the pitch of the joints of the chain. The joints do not participate in the transmission of frictional forces; placement of such additional loading or friction blocks, thus, does not improve the noise level and vibration level since the pitch of the chain links that is, the number of blocks per unit length, is not increased over that of a chain which does not have such blocks.

THE INVENTION

It is an object to provide a link chain of the type suitable for a cone pulley transmission of infinitely variable transmission ratio which is less noisy than previous structures and can be used with existing structures and/or existing chains.

Briefly, the invention is directed to adding resilient friction engagement surfaces engageable with the cones of the cone pulleys to thereby further increase the number of engagement elements per unit length of the chain. This further reduces the pitch or, in operation, the repetition ratio of engagement elements with the cone pulleys, so that the chain, as seen from the cone pulleys, more nearly approaches the aspect of a continuous belt. The elastic and bending capabilities of existing chains are not impaired.

In accordance with the feature of the invention, frame bodies are provided, retained on the chain by interengaging, interlocking engagement with the chain link elements and/or the rocker elements, the frame bodies extending transversely of the chain and being located between the hinge joints formed by the rocker elements. The hinge joints and the rocker elements, as before, are positioned for frictional engagement with the facing surfaces of the cone pulleys. The frame bodies have resilient legs, which are formed with engagement surfaces located laterally adjacent the sides of the outermost chain links for resilient and additional frictional engagement with the facing surfaces of the cone pulleys of the transmission.

The chain, in accordance with the invention, has the advantage that the number of engagement elements—looked at from the engagement surfaces of the cone pulleys—is doubled with respect to previous chains. The operating noise is effectively reduced even further. The gaps between the frictional engagement surfaces of the rocker elements and the lateral surfaces of the frame bodies can be made so small that the facing surfaces of the cone pulleys will "see" an essentially continuous surface. The frame bodies or frame elements cause additional engagement pulses to occur between the previously present engagement pulses due to the rocker elements. The frequency of these pulses occurring as the chain runs between the cone disks is substantially increased and the energy of the individual pulses is substantially decreased.

The frame bodies also contribute to frictional force transmission and thus permit some unloading of the rocker elements. Of course, the frame elements should be so dimensioned that the bending radius of the chain is not affected to an extent which might interfere with operation in the cone pulley transmission.

The frame bodies can be located, longitudinally, symmetrically along the longitudinal extent of the chain. In certain embodiments, it may be suitable to locate the frame bodies in distances from each other which are non-uniform, in order to generate non-uniformly recurring pulses, since such an arrangement may contribute additionally to decrease of noise of operation. It is also possible to shape the frame bodies located longitudinally in different form, and locate them in either recurring or random sequence, in order to further decrease the generation of oscillations in operation of the transmission.

Since the frame bodies also transmit power, the lifetime of the chain is increased by overall reduction of wear-and-tear of the frictional engagement surfaces of the chain as well as of the cone pulleys while having a substantially lower operating noise level.

DRAWINGS

FIG. 1 is a side view of a link chain with frame bodies located thereon;

FIG. 1a is a side view of the link chain of FIG. 1 and showing a different type of frame body;

FIG. 2 is a section along line II—II of FIG. 1 of a chain between a pair of cone pulleys;

FIG. 3 is a view of the chain along the arrow A of FIG. 1;

FIG. 3a is a fragmentary view of the chain of FIG. 1a;

Figure 9:
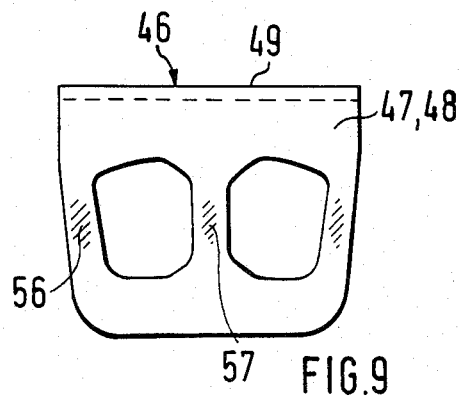
Figure 10:
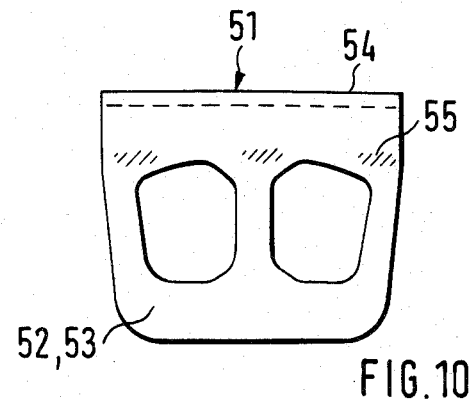
Figure 11:
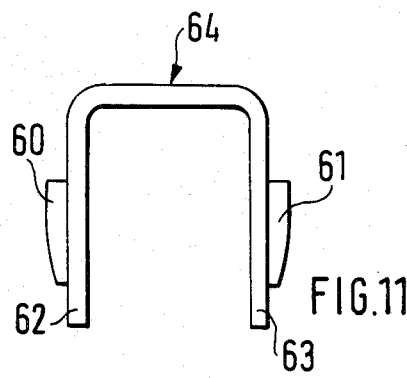
Figure 12:
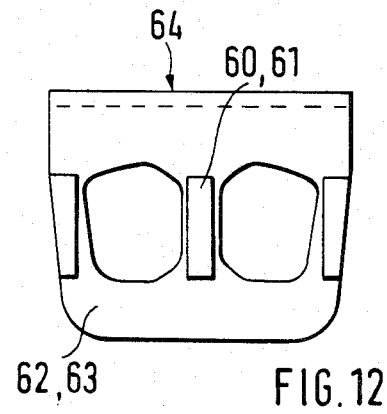
Figures 13, 13A:
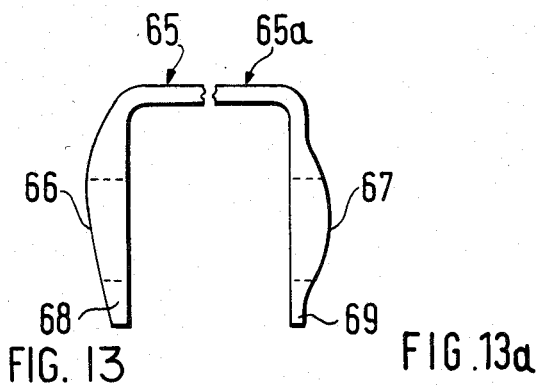
Figure 14:
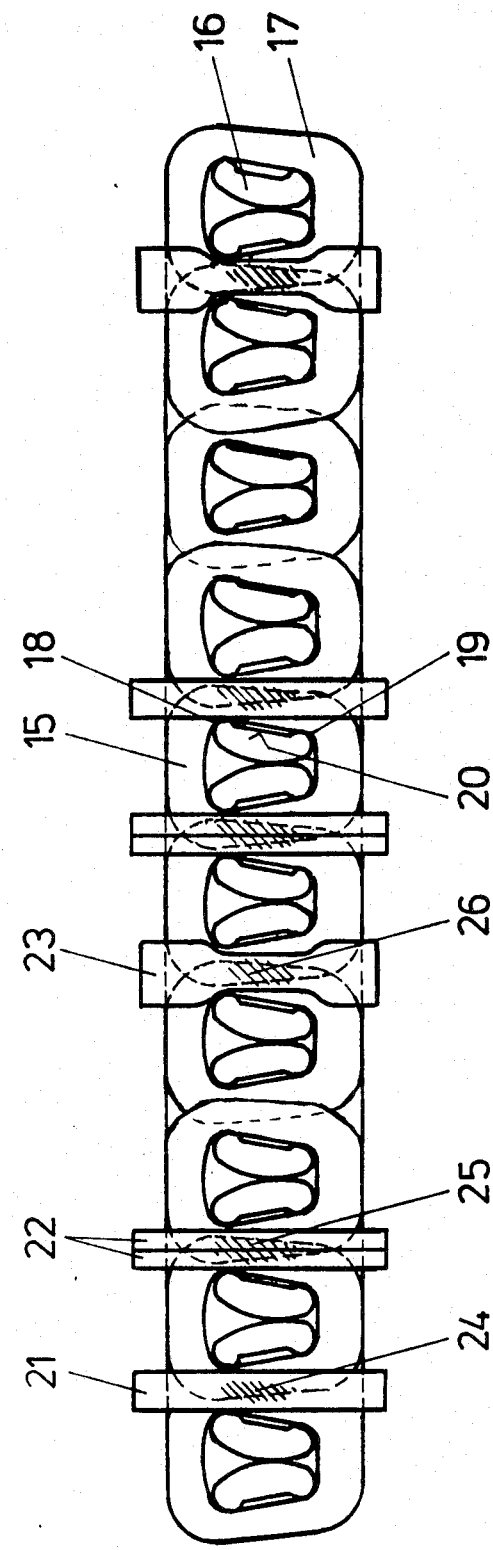

FIGS. 4a, 4b, 4c, collectively, are side views of chains of different types having frame bodies similar to the frame bodies of FIG. 1, in which FIG. 4a has single-element frame bodies;

FIG. 4b has double-element frame bodies;

FIG. 4c shows widened frame bodies, similar to the ones shown in FIG. 1a;

FIG. 5 is a side view of a chain similar to FIG. 4 with different types of frame bodies;

FIG. 6 is a side view of a chain with frame bodies formed as clamping elements;

FIG. 7 is a part-sectional view similar to FIG. 2, taken along line VII—VII of FIG. 6, and illustrating the frame body of FIG. 6;

FIG. 8 is a view similar to FIG. 7, and illustrating a different type of frame body;

FIG. 9 is a side view of the frame body of FIGS. 6 and 7;

FIG. 10 is a side view of the frame body shown in FIG. 8;

FIG. 11 is a front view of a clamping frame body with a modified side surface;

FIG. 12 is a front view of the frame body of FIG. 11;

FIG. 13 is a fragmentary half-view of a frame body similar to FIG. 11, with another type of side engagement surface;

FIG. 13a is a view of a half-framing body similar to FIG. 13, in mirror-image representation, showing yet another embodiment of an engagement surface; and FIG. 14 shows schematically a chain with frames of the type of FIGS. 11 or 13, located at non-uniform spacing.

DETAILED DESCRIPTION

The chain of FIGS. 1-3 has link elements 1 and joint elements formed as rocker elements 3 fitted in openings 2 of the links. The rocker elements 3 are formed, at both sides, with a concave rocker surface 4 (FIG. 1) which is engaged by a convex rocking surface 5 of the radial webs 6 of the links 1. Two respectively adjacent links 1 which are joined by the rocker elements 3 at the pivot or hinge joints formed thereby are, each, identical. The basic structure of the chain is described in the referenced application by the inventor hereof, Ser. No. 402,457, filed July 28, 1982, which shows the details of this chain construction. The rockers engage the cone pulleys.

In accodance with the present invention, frame bodies 7 are associated with the stack of the links forming the chain. The frame elements 7 surround the respective stacks of the links—see FIG. 3—and engage facing surfaces of cone pulleys 12, see FIG. 2. The frame bodies 7 are supported transversely—with respect to the running or longitudinal direction of the chain—by the links of the associated stack of links and are supported in longitudinal direction of the chain with respect to the rocker elements 3 by thickened portions 8, which have surfaces corresponding to the concave rocking surfaces 4 of the rocker elements 3. Thus, the flexibility of the chain, in running direction thereof, is not affected. The frames 7 engage adjacent links 1 with the inner surfaces of lateral portions 9, 10 (FIG. 2). The outer contours of the frames at the side portions 9, 10 correspond in the region of the operating plane to that of the rocker elements 3. The outer surfaces 11, thus, which correspond to the lateral surfaces of the rocker elements 3 form frictional engagement surfaces for frictional force transmission with the cone pulleys 12 as the chain is looped between the cone pulleys.

FIG. 1a illustrates a modification in that the frames 8, which essentially are similar to the frames 7, are enlarged in running direction of the chain by an enlargement 13. This construction permits reduction in size of the frame bodies 8 (FIG. 1a), with respect to the frame bodies 7 (FIG. 1), in radial direction, while maintaining the strength thereof, and permitting equal loading.

Embodiment of FIG. 4 (collectively): The link chain of FIG. 4 is described in detail in the referenced application Ser. No. 285,869, filed July 21, 1981, RATTUNDE and SCHOPF.

Stacked links 15 are connected by pairs of rockers 16 which are supported with respect to the radial end portion 17 of the links associated with the chain element by two spaced engagement surfaces 18, 19. A clearance space 20 is provided between the engagement surfaces 18, 19.

In accordance with the present invention, the chain described in the referenced application Ser. No. 402,457, has frame bodies located thereabout. The frame bodies 21 (FIG. 4a), 22 (FIG. 4b) and 23 (FIG. 4c) are essentially similar; the frame bodies 21, 22, 23 are supported in running direction of the chain with respect to the rocker elements 16 at the outer engagement surfaces 18, whereas, when the chain is stretched, they are free with respect to the inner engagement surfaces 19, so that the chain can be suitably flexed, without interference by the frame elements 21, 22, 23. The general operation of the frames 21, 22, 23, and their function, is the same as that described with respect to frames 7, 8 in connection with FIGS. 1, 1a, 2 and 3. The frames 21, 22, 23 have lateral engagement surfaces 24, 25, 26 which are located in the range of the engagement surfaces or contact line of the rocker element 16 with the facing surfaces of cone pulleys (not shown in FIG. 4, collectively).

The frame 21 of FIG. 4a is made as a straight punched element, located, as a unitary element, in radial direction around the chain. The frame 22, FIG. 4b, differs from frame 21 by being divided into two parallel frame disks. The frame 23, FIG. 4c, is constructed similar to the frame 8 (FIG. 1a), having an enlargement formed radially outwardly of the rocker element 16, which permits reduction, in radial direction, of the size of the rocker element 23 while having the same strength as the frame elements 21, 22.

Embodiment of FIG. 5: The basic chain structure is identical to that of FIG. 4 (collectively), and the same reference numerals have been used herein; FIG. 5 illustrates different frame bodies 30, 31.

The frame bodies 30, 31 are formed of two disks such as the frame bodies 22 of FIG. 4b. Starting from this arrangement, however, the disks 30, 32 and 31, 33 are connected by a strip or rib 34, 35, respectively. This connection improves the resistance of the chain to twist without, however, interfering with the suppleness or bendability of the chain in running direction. To further improve the bendability of the chain in running direction, one of the frame elements, as illustrated in FIG. 5 elements 32 and 33, are bent towards each other, in a direction parallel to the connecting rib 34, 35, respectively. Of course, the other end portions of the frame elements 30, 31 likewise may be bent towards each other in a manner similar to that shown in connection with the portions 32, 33.

Embodiment of FIG. 6: The frame bodies are formed as U-shaped clamping links holding together the stack of links and shaped as U-shaped clamping elements through which the rocker elements pass. The U-shaped frame bodies surround the chain links located therebetween. Reference is made in this connection to a chain described in U.S. Pat. No. 4,344,761, STEUER. Other than that, the chain of FIG. 6, and the chain illustrated in the subseqeunt Figures, to FIG. 13a, corresponds to that shown and described in connection with FIGS. 4 and 5.

FIG. 7 again shows the cone pulleys 40, 41 having facing engagement surfaces, and a link chain located therebetween. The illustration of FIG. 7 is taken along section line VII—VII of FIG. 6 and, except for the frame element, corresponds to that of FIG. 2. The chain has links 43 which, in known manner, have rocker elements 44 passing therethrough. The lateral end surfaces 45 of the rocker elements engage the facing surfaces of the cone pulleys 40, 41 for frictional force transmission between the cone pulleys and the chain.

In accordance with a feature of the present invention, the frame body 46 is a U-shaped clamping element formed of lateral dependent portions 47, 48, cross-connected by a bail portion 49. At the engagement or junction line of the rocker element 44 with the cone disks 40, 41, that is, where the frictional force transmission takes place, the clamping frame bodies 46 are shaped similar to the outer surface 45 of the rocker elements 44. As can be clearly seen in FIG. 6, the rocker elements 44 and the frame bodies 46 will be closely adjacent each other and, hence, the gap between adjacent engagement surfaces of rocker elements and frame bodies upon contact with the cone pulleys 40, 41 of the transmission is substantially reduced.

The end portions 50 of the clamping frame bodies 46 show the engagement of the outer portions 47, 48, transverse to the direction of operation of the chain with the outermost links 43 of the chain.

FIG. 8, in an illustration similar to FIG. 7, shows a different type of U-shaped clamping frame body 51, having outer portions 52, 53 and a connecting bail 54. The lateral engagement surfaces 55 are positioned in engagement with the cone disks 40, 41 at a radially different location from the engagement surface 45 of the rocker elements 44. The engagement surfaces 55 are located—longitudinally in running direction of the chain—between the pivot or hinge joints formed by the rocker elements 44.

FIGS. 9 and 10 illustrate the engagement surface of the rocker elements 46, 51 (FIGS. 7, 8), respectively. The engagement surfaces of frame 46 (FIG. 7) with the cone disks 40, 41 of the lateral elements 47, 48 are shown by hatched zones 56, 57 of FIG. 9.

The engagement surface of frame 51 (FIG. 8) with the cone disks 40, 41 of the lateral elements 52, 53, are shown by hatched zone 55 of FIG. 10.

FIGS. 11-13 illustrate variations of clamping-type frame bodies, generally similar to the clamping frame bodies 46, 51 of FIGS. 6 and 7. The engagement surfaces 56, 57 (FIG. 9) are formed by suitably shaping the outer contour of the clamping frame body by forming projections 60, 61 thereon which have an outer contour surface matching that of the rocker element 16. This arrangement permits placing the lateral legs 62, 63 of the U-shaped frame body 64 (FIGS. 11, 12) parallel to the links of the chain so that they can fully engage, laterally, the links of the chain. FIG. 12 illustrates the U-shaped frame body 64 rotated 90° with respect to FIG. 11.

FIG. 13 and FIG. 13a show half-frame bodies 65, 65a, respectively, in which the lateral surface regions 66, 67, respectively, are formed by suitable thickening of the side portions 68, 69 of the frame body.

In a preferred form, the respective embodiments of FIGS. 13 and 13a will not be used simultaneously on a frame body 65, 65a but, rather, alternatively, so that one body may have both the shapes of FIGS. 13 and 13a, with the respective surfaces 66, 67.

The particular arrangement of the frame bodies on the chain is variable, and any one of the embodiments described of the frame bodies may be used with any of the chains, continuously, sequentially, repetitively sequentially or sequentially, at random (FIG. 14). Of course, the exact shape and construction of the frame body will depend on the respective basic construction of the chain. For example, frames as illustrated in FIG. 5 may be used, alternatively, with frames illustrated in FIG. 4a, FIG. 4b, FIG. 4c. It is also possible to locate the frames at non-uniformly recurring intervals, for example by placing the next frame body 46, with reference to FIG. 6, two links beyond the last link shown on the right, rather than on the next immediately adjacent link, see FIG. 14.

Various changes and modifications may be made, and any feature described herein in connection with any one of the embodiments of the frame elements may be used in connection with any of the others, and any frame element described herein may be used with any type of chain with which it is compatible.

In accordance with a feature of the invention, the frame bodies may be formed as a frame located only between two pivot or hinge points—see FIGS. 1 and 4, collectively. Each one of the frame bodies may be a single unitary element or may be formed as one or more adjacently positoned disks. Such disks—see, for example, disks 22 of FIG. 4c—may be connected by a bail 34, 35, connecting adjacent disk elements, located within or outside of the link chain, and extending in the direction of operation of the chain. The frame bodies, thus, will be interconnected to form a complete frame, in which, preferably, the end elements of the frame which are remote from the connecting bail or strip 34, 35 are preferably bent towards each other, thereby increasing the resistance of the chain with respect to transverse twist without, however, essentially interfering with the suppleness of the chain.

The frame bodies may entirely surround the chain—see FIG. 2—or they may be formed as U-shaped clamping frame bodies (FIGS. 7, 8, 11, 13, 13a). Such clamping frame bodies have been used for other purposes before, primarily to improve the resistance of the chain with respect to twist; in accordance with the present invention, the clamping frame bodies are formed with engagement surfaces to engage the cone pulleys 12; 40, 41, respectively, and contribute to the transmission of power between the chain and the cone pulleys, for example by forming engagement surfaces matching the engagement surfaces of the rocker elements as best seen in FIGS. 9 and 10, or adding separate engagement surfaces 60, 61 (FIGS. 11, 12) or forming lateral projections 66, 67 (FIGS. 13, 13a) thereon.

The lateral surfaces of the frame bodies, therefore, will be in engagement with the facing friction surfaces of the cone disks for frictional force transmission with the cone disks, the engagement surfaces preferably being similar to and matching the engagement surfaces of the rocker elements with the cone disks. The engagement surfaces of the frame bodies may be located at the same radial distance—with respect to the center of rotation of the cone disks—as the rocker elements 3, 16, 44, or may be located at a different distance, preferably radially outwardly—see FIG. 8.

When forming the frame bodies as clamping frame bodies, it is possible to so shape the lateral surfaces of the clamping frame body in the region between the link or pivot points defined by the rocker elements and the links to provide for frictional force transmission contact in the region between the pivot or link points—see the engagement surfaces 56, 57 (FIG. 9) and 55 (FIG. 10). The engagement surfaces 55, see FIG. 10, will be located in the region of the bail connecting adjacting frame bodies; this embodiment also substantially increases the resistance of the chain with respect to longitudinal twist and provides for a comparatively stiff engagement of the lateral surfaces of the frame bodies. The lateral legs, for example legs 62, 63, FIG. 11, formed formed of springy material, biased towards the center portion of the stack of links forming the link chain so that the lateral legs 62, 63 will be in resilient engagement with the links of the chain itself.

Of course, the resiliency of the legs will result in resilient frictional engagement of the legs with the cone disks.

Various other changes and modifications may be made within the scope of the inventive concept.

We claim:

1. Link chain for a variable transmission ratio cone pulley transmission having
    a plurality of chain link elements (1, 15, 43) extending—in the running direction of the chain—longitudinally of the chain,
    the chain link elements being formed with openings (2) therein;
    rocker elements (3, 16, 44) extending transversely of the chain, fitted into the openings, forming hinge joints for the link elements, and having lateral end surfaces (45) dimensioned and shaped for engagement with facing surfaces of the cone pulleys (12; 40, 41) of the transmission,
    said chain further comprising, in accordance with the invention,
    means to reduce operating noise level of the link chain in the transmission, primarily resulting from sequential engagement of the end surfaces (45) of the rocker elements (3, 16, 44) with the facing surfaces of the cone pulleys (12; 40, 41) including
    frame bodies extending transversely of the chain and located between two hinge joints formed by the rocker elements (3, 16, 44) and surrounding the chain links at least over a major extent of the chain links
    lateral resilient engagement surface formed on the frame bodies and located laterally adjacent the sides of the outermost chain link elements for resilient and frictional engagement with the facing surfaces of the cone pulleys (12, 40, 41) of the transmission,
    said frame bodies being retained on the chain by force engagement with at least one of said elements
    to reduce the spacing of surfaces formed on the chain which, in operation, contact facing surfaces of the cone pulleys to only the gap between the lateral end surfaces (45) of the rocker elements and the lateral engagement surfaces of the frame bodies.

2. Chain according to claim 1, wherein (FIGS. 1, 4) the frame bodies comprise frames (7, 8, 21, 22, 23) surrounding the chain links solely between two hinge joints.

3. Chain according to claim 2, wherein (FIG. 4b) each frame body comprises two identical frame disks having major surfaces and located longitudinally—in running direction of the chain—adjacent each other, with the major surfaces of the frame disks abutting each other.

4. Chain according to claim 1, wherein (FIGS. 1, 4) the frame bodies comprise frame disks (7, 8, 21, 22, 23) surrounding the chain links between two hinge joints; and wherein said frame disks are essentially similar.

5. Chain according to claim 4, further including a connecting bail (34, 35) extending in the running direction of the chain and connecting two frame bodies (30, 32; 31, 33) located between adjacent hinge joints to form a connected frame body;
    and wherein at least one of the end portions of the frame disk remote from the connecting bail is bent in the direction facing the other frame disk connected tereto.

6. Chain according to claim 1, wherein (FIGS. 7-13) the frame bodies comprise U-shaped clamping frame bodies (46, 51, 64, 65) surrounding every other stack of chain links, and formed with openings for passage of the rocker elements (44) therethrough.

7. Chain according to claim 1, wherein (FIGS. 1-7; 9; 11-13) the engagement surfaces of the frame bodies are located in the same plane—with respect to adjacent rocker elements (3, 16, 44)—as the lateral end surfaces.

8. Chain according to claim 7, wherein the outer contours of the lateral engagement surfaces correspond to the lateral end surfaces (45) of the rocker elements (3, 16, 44).

9. Chain according to claim 1, wherein (FIGS. 8, 10) the frame bodies comprise U-shaped clamping frame bodies (46, 51, 64, 65) surrounding every other stack of chain links, and formed with openings for passage of the rocker elements (44) therethrough;
    a connecting bail or rib (51) is provided, connecting adjacent frame bodies;
    and wherein the engagement surfaces (55) of the clamping frame bodies for frictional engagement with facing surfaces of the cone portions (40, 41) of the transmission are located in the region of the connecting bail (54).

10. Chain according to claim 1, wherein the frame bodies have lateral resilient portions (46, 47; 52, 53; 62, 63; 68, 69).

11. Chain according to claim 10 wherein the lateral resilient portions of the frame bodies are in resilient engagement with the immediately adjacent chain links (1) of the chain, and resiliently biased towards the center of the chain.

12. Chain according to claim 1, wherein the spacing of the frame bodies on the chain is non-uniform with respect to the chain links.

13. Chain according to claim 1, wherein the frame bodies include frame body elements of different configuration;

and wherein frame bodies of different configuration are located in longitudinal direction of the chain in regular sequence.

14. Chain according to claim 1, wherein the frame bodies include frame body elements of different configuration;

and wherein frame bodies of different configuration are located in longitudinal direction of the chain in irregular sequence.

15. Chain according to claim 1, wherein the frame bodies and the rocker elements include interengaging projection-and-recess interlocking, interengaging zones.

16. Chain according to claim 1, wherein the frame bodies include resilient frictional engagement zones (50; 52, 53) to engage immediately adjacent chain link elements.

* * * * *